United States Patent
Potapov et al.

(10) Patent No.: US 10,936,616 B2
(45) Date of Patent: *Mar. 2, 2021

(54) STORAGE-SIDE SCANNING ON NON-NATIVELY FORMATTED DATA

(71) Applicant: Oracle International Corporation, Redwood Shores, CA (US)

(72) Inventors: Dmitry Mikhailovich Potapov, Emerald Hills, CA (US); Krishnan Meiyyappan, Fremont, CA (US); Alexander Tsukerman, Foster City, CA (US); Kothanda Umamageswaran, Sunnyvale, CA (US); Semen Ustimenko, Sunnyvale, CA (US); Wei Zhang, Foster City, CA (US); Adrian Tsz Him Ng, Redwood City, CA (US); Daniel McClary, San Francisco, CA (US); Allen Brumm, Foster City, CA (US); James Stenoish, San Francisco, CA (US); Robert K. Abbott, Andover, MA (US)

(73) Assignee: Oracle International Corporation, Redwood Shores, CA (US)

( * ) Notice: Subject to any disclaimer, the term of this patent is extended or adjusted under 35 U.S.C. 154(b) by 227 days.

This patent is subject to a terminal disclaimer.

(21) Appl. No.: 14/733,691

(22) Filed: Jun. 8, 2015

(65) Prior Publication Data

US 2015/0356158 A1   Dec. 10, 2015

Related U.S. Application Data

(63) Continuation of application No. 14/685,840, filed on Apr. 14, 2015, now Pat. No. 10,019,473.

(Continued)

(51) Int. Cl.
    *G06F 16/2453*    (2019.01)
    *G06F 16/25*    (2019.01)

(52) U.S. Cl.
    CPC ...... *G06F 16/258* (2019.01); *G06F 16/24542* (2019.01)

(58) Field of Classification Search
    CPC .............. G06F 3/067; G06F 17/30424; G06F 17/30477; G06F 17/30545;
    (Continued)

(56) References Cited

U.S. PATENT DOCUMENTS

| 5,870,743 | A * | 2/1999 | Cohen ............... G06F 17/30445 |
| 6,282,039 | B1 * | 8/2001 | Bartlett .................. G11B 20/12 360/47 |

(Continued)

OTHER PUBLICATIONS

Xiaoxia Huang, "Design and Implementation of a Cache-based Granular Computing System" ISKE 2007, Proceedings, dated Oct. 15, 2007, 6 pages.

(Continued)

*Primary Examiner* — Boris Gorney
*Assistant Examiner* — Vaishali Shah
(74) *Attorney, Agent, or Firm* — Hickman Palermo Becker Bingham LLP

(57) ABSTRACT

A storage system communicatively coupled to a database management system (DBMS performs storage-side scanning of data sources that are not stored in native database storage format of the DBMS. Data sources for external tables are accessible in a storage system referred to as a distributed data access system (DDAS), e.g. a Hadoop Distributed File System. To execute a query that references an external table, a DBMS first generates an execution plan. The DDAS supplies the DBMS with information that specifies each portion of the data source, and specifies which data node to use to access the portion. The DBMS sends a request (Continued)

for each portion to the respective data node, requesting that the data node generate rows from data in the portion. The request may specify scanning criteria, specifying one or more columns to project and/or filter on, and code modules for the data node to execute to generate records.

21 Claims, 10 Drawing Sheets

Related U.S. Application Data

(60) Provisional application No. 62/009,836, filed on Jun. 9, 2014.

(58) Field of Classification Search
CPC ......... G06F 17/30607; G06F 17/30091; G06F 21/6218; G06F 16/258; G06F 16/24542
See application file for complete search history.

(56) References Cited

U.S. PATENT DOCUMENTS

| | | | |
|---|---|---|---|
| 7,082,435 B1* | 7/2006 | Guzman | G06F 16/284 |
| 7,293,011 B1 | 11/2007 | Bedi | |
| 8,019,778 B2 | 9/2011 | Niina | |
| 8,543,554 B1 | 9/2013 | Singh et al. | |
| 8,903,846 B2 | 12/2014 | Srivastava | |
| 9,251,210 B2 | 2/2016 | Chaudhry et al. | |
| 9,916,352 B2 | 3/2018 | Chaudhry et al. | |
| 2003/0065826 A1 | 4/2003 | Skufca et al. | |
| 2003/0105928 A1* | 6/2003 | Ash | G06F 12/0804 711/136 |
| 2005/0131881 A1 | 6/2005 | Ghosh | |
| 2006/0026154 A1 | 2/2006 | Altinel et al. | |
| 2007/0239791 A1 | 10/2007 | Cattell et al. | |
| 2009/0037512 A1* | 2/2009 | Barsness | G06F 17/30575 709/201 |
| 2009/0049013 A1 | 2/2009 | Kumbi et al. | |
| 2011/0314047 A1 | 12/2011 | Koronthaly et al. | |
| 2012/0087947 A1 | 4/2012 | Sanchez | |
| 2012/0158698 A1* | 6/2012 | Bestgen | G06F 17/30463 707/718 |
| 2012/0219023 A1 | 8/2012 | Cahill et al. | |
| 2012/0310916 A1 | 12/2012 | Abadi | |
| 2012/0323947 A1* | 12/2012 | Bice | G06F 17/3043 707/760 |
| 2013/0091094 A1 | 4/2013 | Nelke | |
| 2014/0201478 A1 | 7/2014 | Gunda et al. | |
| 2014/0222777 A1 | 8/2014 | Creamer et al. | |
| 2014/0258255 A1* | 9/2014 | Merriman | G06F 17/30362 707/704 |
| 2014/0258300 A1 | 9/2014 | Baeumges | |
| 2014/0317084 A1 | 10/2014 | Chaudhry et al. | |
| 2015/0019559 A1* | 1/2015 | Maquaire | G06F 16/907 707/740 |
| 2015/0254257 A1* | 9/2015 | Kritchko | G06F 17/30575 707/634 |
| 2015/0356131 A1 | 12/2015 | McClary et al. | |
| 2016/0147833 A1 | 5/2016 | Chaudhry et al. | |
| 2016/0196530 A1* | 7/2016 | Staffin | G06Q 10/10 709/204 |
| 2017/0017683 A1 | 1/2017 | Fourny et al. | |
| 2019/0102346 A1 | 4/2019 | Wang et al. | |
| 2019/0102412 A1 | 4/2019 | Macnicol et al. | |
| 2020/0125572 A1 | 4/2020 | Hanckel | |

OTHER PUBLICATIONS

Harder, Theo, "DBMS Architecture—New Challenges Ahead", Datebank—Specktum, Ohsu Digital Commons, dated Jan. 1, 2005, 12 pages.

U.S. Appl. No. 15/012,742, filed Feb. 1, 2016, Interview Summary, dated Dec. 5, 2016.

Chaudhry, U.S. Appl. No. 15/012,742, filed Feb. 1, 2016, Final Office Action, dated Jan. 30, 2017.

McClary, U.S. Appl. No. 14/685,840, filed Apr. 14, 2015, Office Action, dated Mar. 31, 2017.

Chaudhry, U.S. Appl. No. 15/012,742, filed Feb. 1, 2016, Notice of Allowance, dated Apr. 11, 2017.

McClary, U.S. Appl. No. 14/685,840, filed Apr. 14, 2015, Notice of Allowance, dated Feb. 28, 2018.

McClary, U.S. Appl. No. 14/685,840, filed Apr. 14, 2015, Final Office Action, Oct. 20, 2017.

KD Nuggets, "Apache Arrow and Apache Parquet: Why We Needed Different Projects for Columnar Data, on Disk and In-Memory", www.kdnuggets.com/2017/02/apache-arrow-parquet-columnar-data, Feb. 2017, 8pgs.

Palkar, et al., "Filter Before You Parse: Faster Analytics on Raw Data with Sparser", Proceedings of the VLDB Endowment, vol. 11, No. 11, dated 2018, 14 pages.

Mustard et al., "JumpGate: Towards In-Network Data Processing", dated 2019, 3 pages.

Kornacker et al., "Impala: A Modern, Open-Source SQL Engine for Hadoop", 7th Biennial Conference on Innovative Data Systems Research (CIDR'15) dated Jan. 4-7, 2015, 10 pages.

Balkesen et al., "RAPID: In-Memory Analytical Query Processing Engine with Extreme Performance perWatt", SIGMOD'18, Jun. 10-15, 2018, Houston, TX, USA, 13 pages.

Agrawal et al., "A Many-core Architecture for In-Memory Data Processing", MICRO-50, Oct. 14-18, 2017, Cambridge, MA, USA, 14 pages.

* cited by examiner

DDL statement 401

```
CREATE TABLE customer_address
(ca_customer_Id number(10,0)
, ca_street number char(10)
, ca_state char(2)
, ca_zip char(10)
)
ORGANIZATION EXTERNAL (
TYPE DDAS_TABLE
ACCESS PARAMETERS (DDAS: Distributed_File_System_104,
                   COLMAP: "ca_zip"="postal_code")
LOCATION ('customer_address')
)
```

FIG. 4

DDL statement 701

CREATE TABLE shipping_address
(sh_customer_Idnumber(10,0)
, sh_street_number char(10)
, sh_state    char(2)
; ca_zip    char(10)
)
ORGANIZATION EXTERNAL (
TYPE DDAS_FILE
ACCESS PARAMETERS (DDAS: DDAS_104,
                COLUMN_READER: DDAS_104.ext_tab_lib.ShASer
                RECORD_READER: DDAS_104.ext_tab_lib.ShAOutput
         DDAS_NATIVE_CONVERTER DDAS_104.ext_tab_lib.ORA_ELF)
LOCATION ('DDAS:/DDAS_104'/'shippingAddresses.json')
)

FIG. 7

STORAGE-SIDE SCANNING ON NON-NATIVELY FORMATTED DATA

RELATED APPLICATIONS

The present application claims priority to U.S. Provisional Application No. 62/009,836, entitled External Tables For Distributed Files, filed by Dmitry Potapov, et al. on Jun. 9, 2014, the contents of which are incorporated herein by reference; the present application is a continuation of U.S. patent application Ser. No. 14/685,840, entitled Accessing An External Table In Parallel To Execute A Query, filed by Daniel McClary, et al. on Apr. 14, 2015, the contents of which are incorporated herein by reference, and which claims priority to U.S. Provisional Application No. 62/009,836, External Tables For Distributed Files.

FIELD OF THE INVENTION

The present invention relates to database technology, and in particular, external tables defined by a Database Management System (DBMS).

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. DBMS's A DBMS comprises one or more database servers that manage access to a database. A database comprises data and metadata. From a high-level perspective, that data and metadata is maintained in logical structures, for example, according to relational and/or object-relational database constructs. Database metadata defines database objects, such as tables, object tables, views, or complex types. SQL data definition language ("DDL") instructions are issued to a DBMS to create or configure database objects.

Generally, data is logically structured within a database as one or more data containers. Each container contains records. The data within each record is organized into one or more fields. In relational database systems, the data containers are typically referred to as tables, the records are referred to as rows, and the fields are referred to as columns. In object oriented databases, the data containers are typically referred to as object types or classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be typically associated with relational or object-relational databases. Thus, the terms "table," "row," and "column" shall be used herein to refer respectively to a data container, a record, and a field.

Storage Systems

A DBMS maintains the underlying data for a database in one or more persistent storage systems. These storage systems typically provide the DBMS with large capacities of persistent, non-volatile storage in which the DBMS may store the underlying data, often in the form of one or more storage devices such as hard disks. One example of such a storage system is a storage array.

Many storage systems are optimized with software or hardware logic for performing low-level, specialized data management functions, such as storage device backup, storage device optimization, striping across multiple individual storage devices, shared data access, block caching, and so on. Accordingly, a DBMS often relies on storage systems to provide such low-level functions, so that the DBMS can utilize their resources for other tasks, such as query compilation and execution, data analysis, and communication with clients.

In many embodiments, the storage systems utilized by a DBMS constitute little more than one or more simple, linearly addressed, block-based persistent storage devices. As such, the storage systems may be oblivious to the logical structures represented by the underlying data the storage systems store. Furthermore, interaction between the DBMS and storage systems may be limited to simple input/output (I/O) requests to read or write ranges of bytes or blocks from or to disk. Thus, while the DBMS presents database data to clients as logical structures such as those described above, the underlying data for a database may be stored in different, simpler structures at the storage system. The structures conform to a format interpretable by a DBMS, the format by referred to herein as a database storage format.

A database storage format prescribes a structure for units of data in persistent storage that are used to store underlying database data. Database server software and/or hardware of a DBMS is configured to write units of data to a storage system that are formatted in a database storage format. When the DBMS reads the data from the storage system, the DBMS is able to interpret the data because it conforms to the database storage format.

For example, in order for a database server to store data on a hard disk, a database server writes data to raw blocks having a structure supported by the hard disk, the data being formatted by the DBMS in accordance to a database storage format. Raw blocks that conform to a database storage format are referred to herein as data blocks. The database storage format may include a row storage format. For example, rows may be delimited by a row size delimiter specifying the size of the row; one or more columns in the row may be delimited by a column size delimiter. The data storage format may include various data types used to represent column values. The database storage format may also include control information in, for example, a data block header. Such control information can include, without limitation, any of: a number of rows stored in the data block, a database check point for the data block, information about what transactions have locked a data block or a row in the data block, whether the database data in the data block is stored in columnar-major form or row-major form, and compression information for the data block.

Because database server software and/or hardware of a DBMS is specifically configured for one or more particular database storage formats, the DBMS is able to interpret, as logical tables, the data within data blocks retrieved from the storage system. For example, when a database server executes a query that requires access to a table in a database, the database server sends a read request to the storage system for data blocks storing data for the table. In response to the request, the storage system may read the identified data blocks from storage and send those data blocks to the database server. The database server may then interpret the data block as logical rows and columns of a table. The database server executes the command based on its interpretation of the data block as data for a table.

Database storage formats used by various database vendors are generally proprietary. A database storage format for which the database server software and/or hardware of a DBMS is configured to store underlying data and interpret is referred to as a native database storage format of the database server and/or DBMS.

Scan-Enabled Storage Systems

The time required to request and retrieve data blocks from a storage system represents a significant amount of the time required for a database server to execute a database command. Unfortunately, in many executions of a database command, portions of data blocks and even the entirety of data blocks retrieved from a storage system may not be relevant to the execution of the database command. For example, a client may request data for only a specific column of a table. Because of the database storage format of data blocks, the database server may be required to request data blocks comprised of data not just for the requested column, but for other columns as well. The database server will then discard the data for the non-requested columns. Thus, the transfer of data for non-requested columns was unnecessary.

To avoid such unnecessary transfer of data between storage systems and a DBMS, a "scan-enabled" storage system may be configured for storage-side scanning. In storage-side scanning, a scan-enabled storage system projects columns and filters rows stored in data blocks that conform to the native database storage format of the DBMS. To cause a scan-enabled storage system to project columns and filter rows stored in data blocks, the DBMS issues a "storage-side scan request" to the scan-enabled storage system. The storage-side scan request specifies the data blocks to read, and which columns to project and filter on.

Data blocks stored in a scan-enabled storage system may in various circumstances be interpreted by either the scan-enabled storage system and the DBMS that stores data blocks in the storage system, or both. Thus, the software/and hardware of both the scan-enabled storage system and the DBMS is configured to interpret the native database storage format of the DBMS.

While a scan-enabled storage system is configured to interpret a native database storage format of the DBMS for which scan-enabled storage system stores data blocks, the scan-enabled storage system remains oblivious to which data blocks store data for a particular database table defined by the DBMS, or which column in a data block corresponds to a particular table column defined by the DBMS. Thus, to perform projection or filtering, a scan-enabled storage system depends on input provided by a DBMS in a storage-side scan request, the input specifying the data blocks and the one or more columns therein to perform projection and filtering.

External Tables

A DBMS may provide a table abstraction of data from a data source that is not formatted in the native database storage format of a DBMS. Such a table is referred to herein as an external table. The data source may be a file stored in a storage system, such as a file containing lines of a comma delimited fields.

A DBMS may define an external table in response to receiving a DDL (Data Definition Language) statement that describes the external table. The DDL statement specifies one or more columns for the external table ("DBMS table columns") and a data source of the external table, such as a file in a storage system.

Because a data source for an external table is not necessarily stored in the native database storage format of the DBMS, the projecting and filtering capabilities of storage-side scanning is not available for external tables. Described herein are approaches for providing storage-side scanning for external tables.

BRIEF DESCRIPTION OF THE DRAWINGS

In the drawings:

FIG. 4 depicts a DDL statement used for defining an external table according to an embodiment of the present invention.

FIG. 7 depicts a DDL statement used for defining an external table according to an embodiment of the present invention.

DESCRIPTION OF EXAMPLE EMBODIMENTS

Overview

Described herein is an approach for storage-side scanning of external tables. The approach is referred to herein as storage-side-external-table scanning. Under storage-side-external-table scanning, a storage system, which is communicatively coupled to a DBMS, performs storage-side scanning of data sources that are not stored in the native database storage format of the DBMS.

According to an embodiment, data sources for external tables are accessible in a storage system referred to herein as a distributed data access system. A distributed data access system comprises a cluster of data nodes that is connected to a DBMS. An example of a distributed data access system is a Hadoop Distributed File System. Access to a data source is distributed across the data nodes; generally, a portion of the data source may be accessed only, or at least more efficiently, by a particular data node.

A DBMS may execute queries that reference an external table. To execute the query, a DBMS first generates an execution plan. To generate the execution plan, the distributed data access system supplies the DBMS with information that specifies each portion of the data source, and specifies which data node to use to access the portion. The DBMS sends a request for each portion to the respective data node, the request requesting that the data node generate rows from data in the portion. The request may specify scanning criteria, specifying one or more columns to project and/or filter on. The request may also specify code modules for the data node to execute to generate rows or records and columns.

An execution plan generated by a DBMS defines operations to be performed to execute a query and an order for performing the operations. Such operations are referred to herein as plan operations. A DBMS may execute the execution plan as a distributed operation. The execution plan divides many kinds of plan operations into work granules, some of which may be executed in parallel.

An execution plan generated for storage-side-external-table scanning includes multiple work granules that generate rows from a data source for a single external table. Such work granules are referred to herein as external work granules. Each external work granule entails generating rows for a respective portion of a data source. Each external work granule of the execution plan may be executed, at least in part, by a data node that generate rows from the portion. The rows may be projected or filtered according to scanning criteria associated with the external work granule.

Illustrative External-DDAS System

Figure 1:
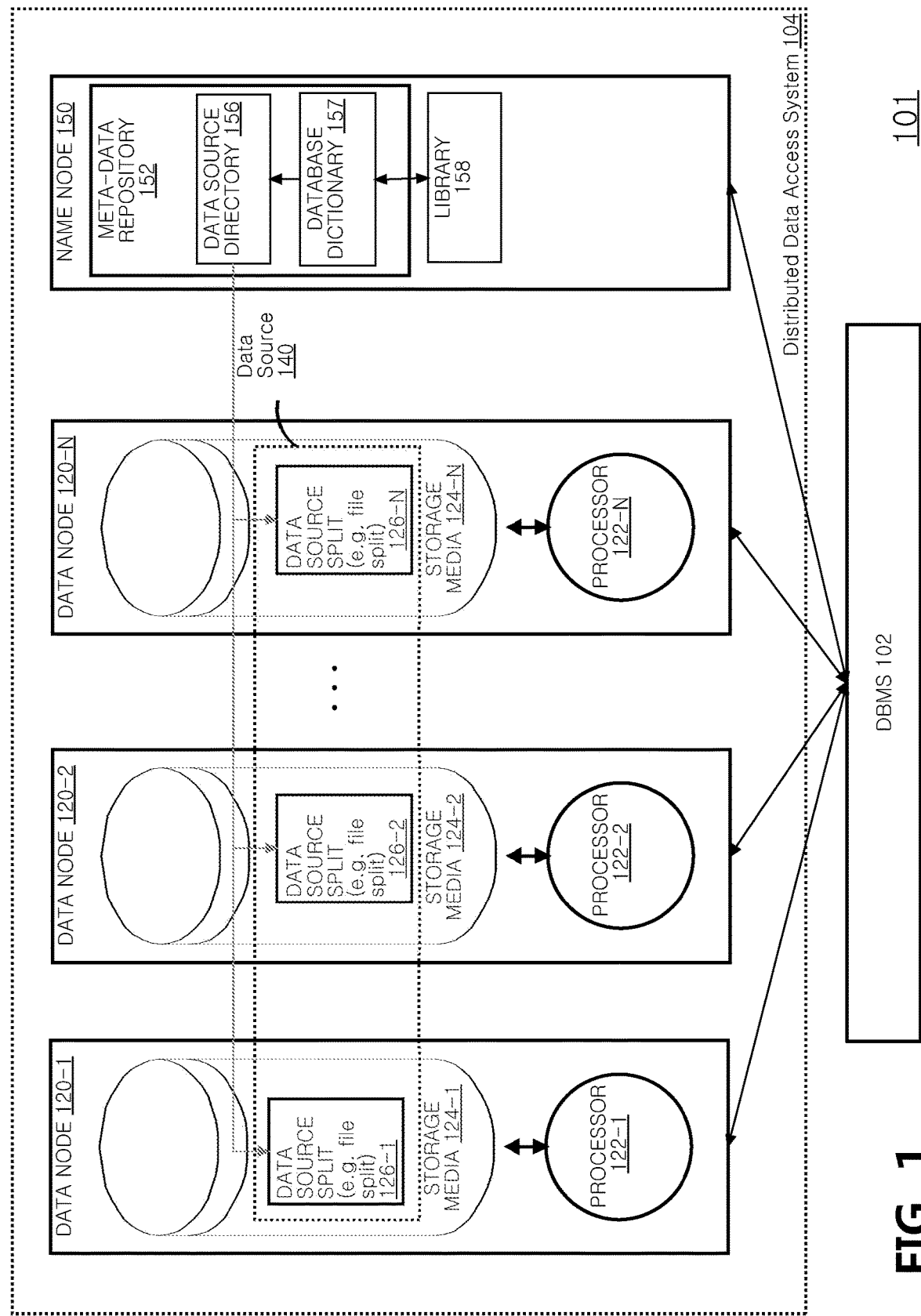
FIG. 1 is a diagram depicting a DBMS and distributed data access system enabled for parallelized-external-table access.

FIG. 1 is a diagram that depicts a DBMS and distributed data access system enabled for parallelized-external-table access, according to an embodiment of the present invention. Referring to FIG. 1, DBMS 102 comprises one or more database servers (not shown) and storage devices (not shown) for storing database data.

DBMS 102 is coupled over a network connection to Distributed Data Access System 104. DBMS 102 is configured to retrieve data for external tables from data nodes of Distributed Data Access System 104, the data nodes generating the data from a data source to which access is distributed across data nodes. An example of such a data source is a file stored across multiple data nodes. The data in the file does not conform to the native database storage format of DBMS 102. For example, the data may be application data formatted in accordance to XML or JSON.

A distributed data access system comprises at least two types of nodes, a data node, and a name node. A data node in a distributed data access system is responsible for generating data from a specified portion of a data source, the portion being referred to herein as a data source split. For example, a data source may be a file that is stored within a distributed data access system across multiple data nodes, each of the data nodes storing a separate portion of the file. The separate portion is referred to herein as a file split of the file. The combination of a data source split and the data node that is responsible for generating data from data source split is referred to herein as an input split.

A name node tracks and provides information about data sources and the input splits for the data sources within a distributed data access system. Specifically, a name node stores metadata about each data source within a distributed data access system, which may include, for each data source, the input splits for the data source, and for each input split, a data source split and a data node in the distributed data access system that produces data for the input split. In addition, the name node provides an interface through which a client of a distributed data access system, such DBMS 102, may request data specifying input splits for a data source.

Data nodes are the workers of a distributed data access system. A primary purpose of the data nodes is to perform a task requested by a client in parallel with other data nodes. The task involves generating data from a data source; each data node performs a task on a data source split of the data source. A task performed on a data source split by a data node is referred to herein as a split task. Each data node performs a split task on a data source split in parallel with other data nodes performing the task on a respective data source split.

To execute a task on a data source in a distributed data access system, a client requests the inputs splits for the data source from the name node, and sends a request to the data node of each input split to perform a split task on the respective data source split. The request specifies which code modules to use to perform the split task, as shall be explained in greater detail.

FIG. 1 depicts Distributed Data Access System 104 according to an embodiment. Distributed Data Access System 104 comprises Data Node 120-1, Data Node 120-2 and Data Node 120-N, as well as other nodes not depicted. Each data node in Distributed Data Access System 104 comprises storage media and one or more processors for processing data stored on the storage media. Storage media may be any form of memory for storing data, including volatile memory, such as DRAM, or non-volatile memory, such as disk storage, flash storage, or PRAM (persistent random access memory). Data Node 120-1 comprises storage media 124-1 and processor 122-1, Data Node 120-2 comprises storage media 124-2 and processor 122-2, and Data Node 120-N comprises storage media 124-N and processor node 122-N.

The data source splits of a data source in Distributed Data Access System 104 may be stored across the storage media of multiple data nodes. Data Source 140 comprises three data source splits each being stored on a separate data node. Data source split 126-1 is stored in Data Node 120-1, data source split 126-2 in Data Node 120-2, and data source split 126-N in Data Node 120-N. For example, Data Source 140 may be a file comprising file splits. A file split is stored in Data Node 120-1, a file split is stored in Data Node 120-2, and a file split is stored in Data Node 120-N.

A single file stored across data nodes has been described as an example of a data source, however, an embodiment of an invention is not limited to a data source that is a single file stored across data nodes. A data source may include multiple files accessible to the data nodes via a network. One data source split for the data source may be a file split of one file, another data source split may be a file split of another file. As another example, a data source may be a table stored in a DBMS accessible to the data nodes via a network; a data source split for an input split could be a set rows in a table.

Library

Distributed Data Access System 104 includes Library 158. Library 158 stores code modules executable by data nodes to perform a task requested by a client of Distributed Data Access System 104. In general, when a client requests Distributed Data Access System 104 to perform a task for execution by data nodes in Distributed Data Access System 104, a client sends a request to each data node to perform a split task on the data source split. When a client sends such a request to a data node, the client specifies which code modules to execute to perform the task. A data node retrieves the specified code modules from Library 158, as shall be explained in greater detail.

Library 158 is depicted as being stored in Name Node 150. However, the library may be stored on any node within Distributed Data Access System 104, and/or copies of code modules may be distributed among multiple nodes within Distributed Data Access System 104.

In an embodiment, code modules in Library 158 comprise byte code compiled from an object-oriented language that may be executed on a virtual machine configured to execute byte code. For example, Library 158 may comprise compiled Java classes. However, code modules in Library 158 may comprise compiled or un-compiled code generated using any computer language. An embodiment of the present invention is not limited to any particular computer language.

Code modules in Library 158 conform to an API ("Application Program Interface") established for Distributed Data Access System 104, hereafter referred to as the DDAS API. The DDAS API defines a set of classes, class methods, routines and arguments thereof for code modules executable by nodes in Distributed Data Access System 104 to perform a task on a data source. By developing code modules that conform to the DDAS API, developers develop customized code modules that may be deployed and executed within Distributed Data Access System 104. An example of such a customized code module includes a Java class configured to read data from a file split of a file having a particular format and generate output from the data read in the form of records. An example DDAS API is the MAP Reduce API for the Hadoop Distributed File System.

Name Node

Distributed Data Access System 104 includes a Name Node 150. Name Node 150 comprises Meta-Data Repository 152, which stores meta-data describing and defining various aspects of Distributed Data Access System 104.

Meta-Data Repository 152 comprises a data source directory 156 and database dictionary 157. Data source directory 156 stores meta-data about data sources accessible within Distributed Data Access System 104.

Distributed Data Access System 104 provides DBMS-like capabilities, including the ability to define tables and query the tables using a database query language, such as SQL. To define the tables, a Meta-Data Repository 152 includes database dictionary 157, which stores meta-data defining the tables. Specifically, for each of the tables, database dictionary 157 defines one or more columns, data types thereof, one or more data sources to access data for a table, and code modules that are executed to generate records from the data sources and to generate columns for the records. A table defined by Distributed Data Access System 104 is referred to herein as a DDAS table. The column data types that may be defined by Distributed Data Access System 104 are referred to herein as DDAS column data types. The column data types that may be defined by a DBMS are referred to herein as DBMS column data types.

Elements Used During Query Run-Time

As mentioned before, storage-side-external-table scanning entails several phases, some of which are performed as part of larger more comprehensive operations and phases undertaken to execute a database statement in general. The first of the several phases is the External Table Registration phase, which defines various aspects of an external table, including aspects related to generating rows for the external table from a distributed data access system.

Figure 2A:
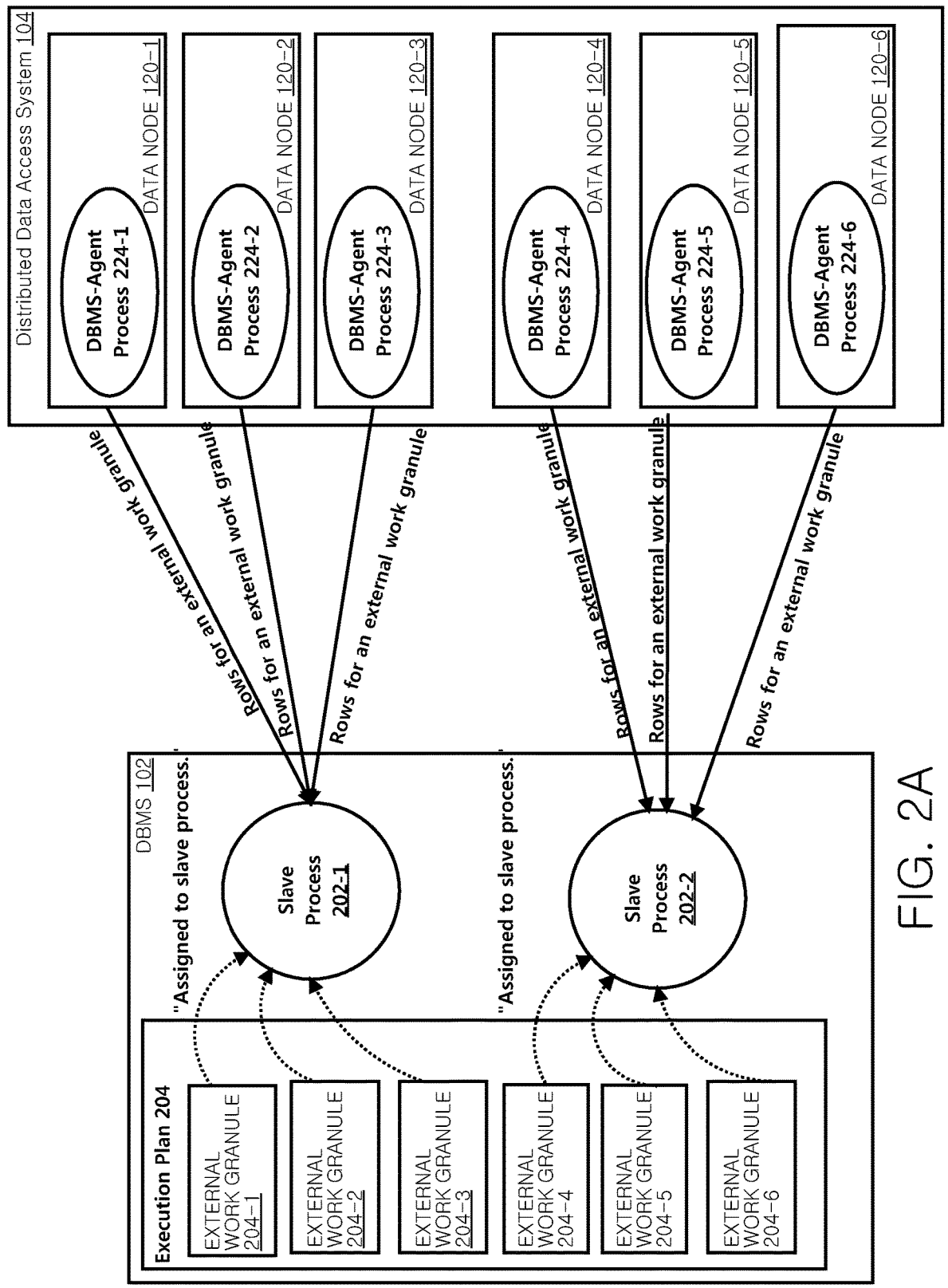
FIG. 2A is a diagram that depicts external work granules of an execution plan executed by a DBMS and distributed data access system according to an embodiment of the present invention.
Figure 2B:
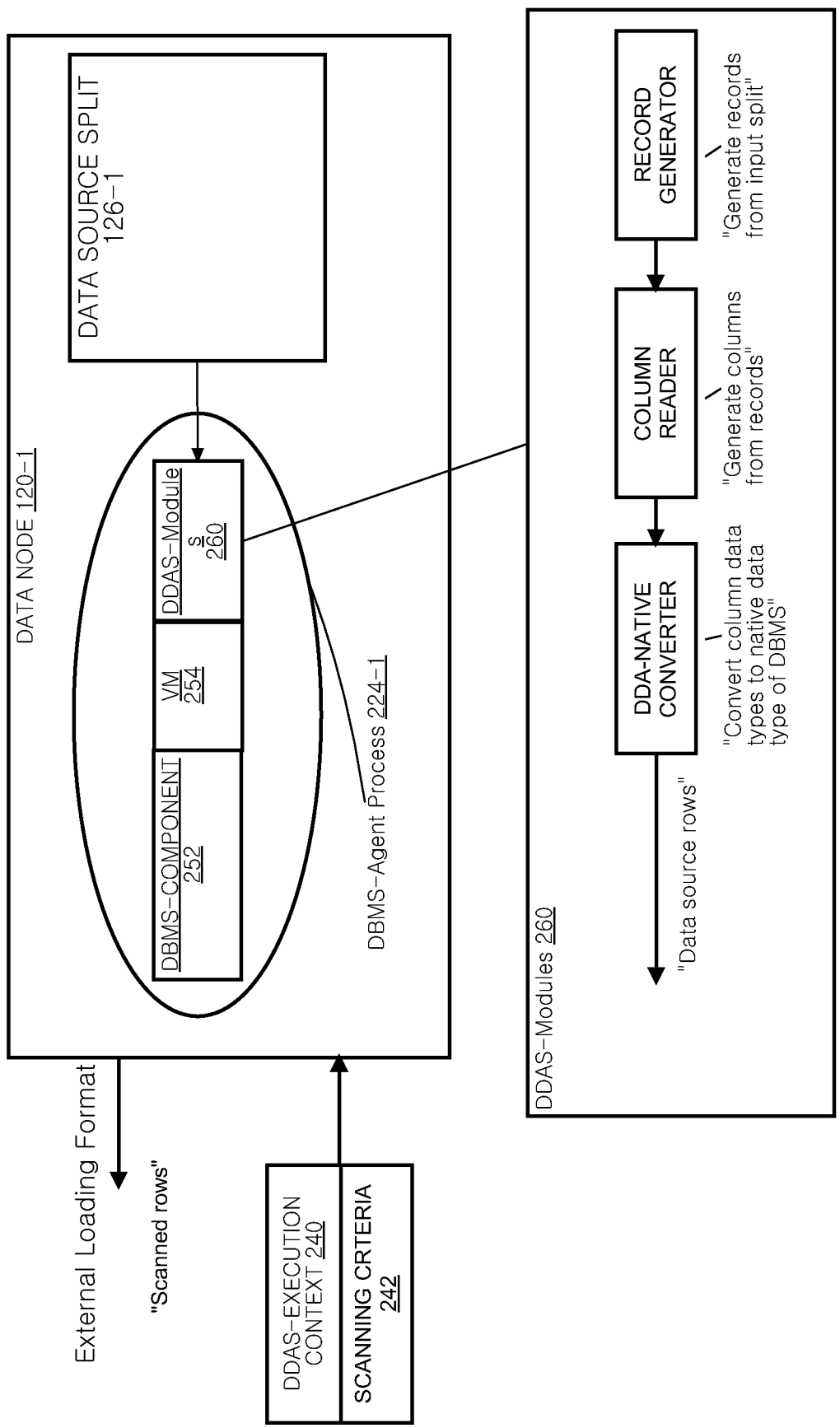
FIG. 2B is a diagram that depicts elements used on a data node executing external work granules according to an embodiment of the present invention.

Other phases include the Describe-Time phase, which is performed when compiling a query, and the External-Granule-Execution phase, which is performed when executing an execution plan for the query. To describe details of the External Table Registration phase, Describe-Time phase, and External-Granule-Execution phase, it is useful to describe some of the elements that are used and/or generated by a DBMS and/or distributed data access system during execution of a query, and in particular, during the External-Granule-Execution phase. FIGS. 2A and 2B describe such elements.

Referring to FIG. 2A, FIG. 2A depicts an execution plan 204. The work granules generated for execution plan 204 include external work granules. An external work granule in execution plan 204 generates rows from an input split and is executed not only by a slave process running within a DBMS but also by at least a process running on a data node, the process on the data node working in tandem with the slave process to generate rows, as shall be described in greater detail. A process that is running on a data node and that is working in tandem with a slave process in the DBMS to generate rows from an input split is referred to herein as a DBMS-agent process.

Referring to FIG. 2A, FIG. 2A depicts execution plan 204, which may be executed by DBMS 102 to execute a query. Execution plan 204 defines, among other work granules, External Work Granule 204-1, External Work Granule 204-2, External Work Granule 204-3, External Work Granule 204-4, External Work Granule 204-5, and External Work Granule 204-6.

During execution of execution plan 204 during the External-Granule-Execution phase, each of the external work granules is assigned to either Slave Process 202-1 or slave process 202-2. In general, one external work granule may be assigned to one slave process at a time. When execution of an external work granule is completed by a slave process, another work granule is assigned to the slave process if any unassigned work granule is available. Alternatively, a slave process may be concurrently assigned multiple work granules. As depicted in FIG. 2A, External Work Granule 204-1, External Work Granule 204-2, and External Work Granule 204-3 are assigned to Slave Process 202-1 and External Work Granule 204-4, External Work Granule 204-5, and External Work Granule 204-6 are assigned Slave Process 202-2.

When assigned an external work granule, a slave process works in tandem with a DBMS-agent process running on a data node of Distributed Data Access System 104 to generate rows from an input split defined for the external work granule. If a slave process is currently assigned multiple work granules, a slave process concurrently works in tandem with multiple DBMS-agent processes.

Referring to FIG. 2A, DBMS-Agent process 224-1, DBMS-Agent process 224-2, DBMS-Agent process 224-3, DBMS-Agent process 224-4, DBMS-Agent process 224-5, and DBMS-Agent process 224-6 are DBMS-agent processes running on Distributed Data Access System 104. Working in tandem with Slave Process 202-1, DBMS-Agent process 224-1, DBMS-Agent process 224-2, and DBMS-Agent process 224-3 generate rows from a respective input split for External Work Granule 204-1, External Work Granule 204-2, and External Work Granule 204-3. Working in tandem with Slave Process 202-2, DBMS-Agent process 224-4, DBMS-Agent process 224-5, and DBMS-Agent process 224-6 generate rows from a respective input split for External Work Granule 204-4, External Work Granule 204-5, and External Work Granule 204-6.

More Data-Node Side Elements

FIG. 2B depicts various elements used on Data Node 120 during the External-Granule-Execution phase. These elements are exemplary of elements used on other data nodes in Distributed Data Access System 104 during the External-Granule-Execution phase. Referring to FIG. 2B, DBMS-Agent Process 202 is connected to a slave process DBMS 102. DBMS-Agent Process 202 performs services and functions related to generating rows for DBMS 102 for an input split. These services and functions are implemented through various software components. These components include DBMS-Component 252, VM (Virtual Machine) 254, and DDAS-Modules 260.

DDAS-Modules 260 are executed by a DBMS-agent process to generate rows from an input split for an external table. DDAS-Modules 260 are developed in accordance with the aforementioned DDAS API. Distributed Data Access System 104 may store different types of data sources; a different set of DDAS-modules may be developed to handle each different type of data source. According to an embodiment, DDAS-Modules 260 contain three different categories of modules.

Record Reader—A record reader generates records from a type of data source or a specific data source. For example, different Record Readers may be used for different file types.

Column Reader—A column reader generates column values for records generated by a record reader. Different column readers may be developed for different types of data sources. The column values generated conform to a DDAS column data type.

DDAS-Native Converter—A DDAS-Native converter converts the data type of column values in records generated by a column reader to rows having a row format with column values having DBMS column data types. According to an embodiment, the row format and DBMS column data types is an "external-loading format", used by DBMS 102 for loading (or in other words, importing) external data for external tables, as shall be described later in further detail.

For example, a data source may be a file containing data formatted in comma-separated value format, which is a format where fields are separated by a comma character and records are lines separated by an end-of-line character. A record reader configured for this type of file generates a record for each line. A column reader reads each record generated by the record reader and generates column values that conform to a DDAS column data type within each record. A DDAS-Native converter converts records and column values contained therein into rows that conform to the external-loading format, the rows having column values that conform to a DBMS column data type.

As another example, another type of data source may be a file that contains JSON objects. A record reader generates a record for each JSON object. For each record generated, a column generator generates the column values that conform to a DDAS column data type. A DDAS-Native converter converts records containing the column values conforming to DDAS column data types to rows with column values conforming to an external-loading format of DBMS 102. The rows generated by DDAS-Native converter are referred to herein as data source rows.

According to an embodiment, DDAS-Modules 260 are executed by a virtual machine, such as VM 254. For example, DDAS-modules maybe Java™ classes that are executed by a Java virtual machine.

DBMS-Component 252 serves as an interface between data nodes and slave processes executing work granules on DBMS 102 to retrieve rows for an input split from a data node. DBMS-Component 252 returns the rows to DBMS 102 using protocols and formats supported by DBMS 102 for receiving rows generated for work granules. DBMS-Component 252 also causes execution of the DDAS-modules that are needed to generate rows from a particular data source. For example, the particular record reader, column reader and DDAS-native converter needed to generate rows for a particular data source are implemented by Java classes. DBMS-Component 252 causes VM 254 to execute these Java classes to generate the rows for a particular file split of a file.

The DBMS-Component 252 applies one or more scanning criteria to data source rows generated by DDAS-Modules 260 to generate "scanned rows", which are projected or filtered according to the scanning criteria. In an embodiment, DBMS-Component 252 is not implemented as Java classes, as DDAS-modules 260 may be Rather DBMS-Component 252 comprise machine-level code compiled from, for example, C source code, thereby enabling scanning criteria to applied more efficiently.

DDAS-Execution Context 240 describes how a DBMS-agent is to execute an external work granule to generate data source rows. Specifically, DDAS-execution context 240 specifies an input split for a data node and the DDAS-Modules 260 that a DBMS-agent process should execute to generate rows from an input split. DDAS-execution context 240 is generated during the Describe-Time phase and passed to a DBMS-agent process during the Query-Run-Time phase.

Scanning criteria 242 specifies criteria to perform a projection operation and/or filter operation on the data source rows. A projection operation returns in the scanned rows one or more columns from data source rows according to projection criteria specified by scanning criteria 242. A filter operation returns rows that satisfy one or more filtering criteria specified by scanning criteria 242. The filtering criteria is based on one or more columns of the data source rows.

Parallelized-External-Table Access Phases

Figure 3:
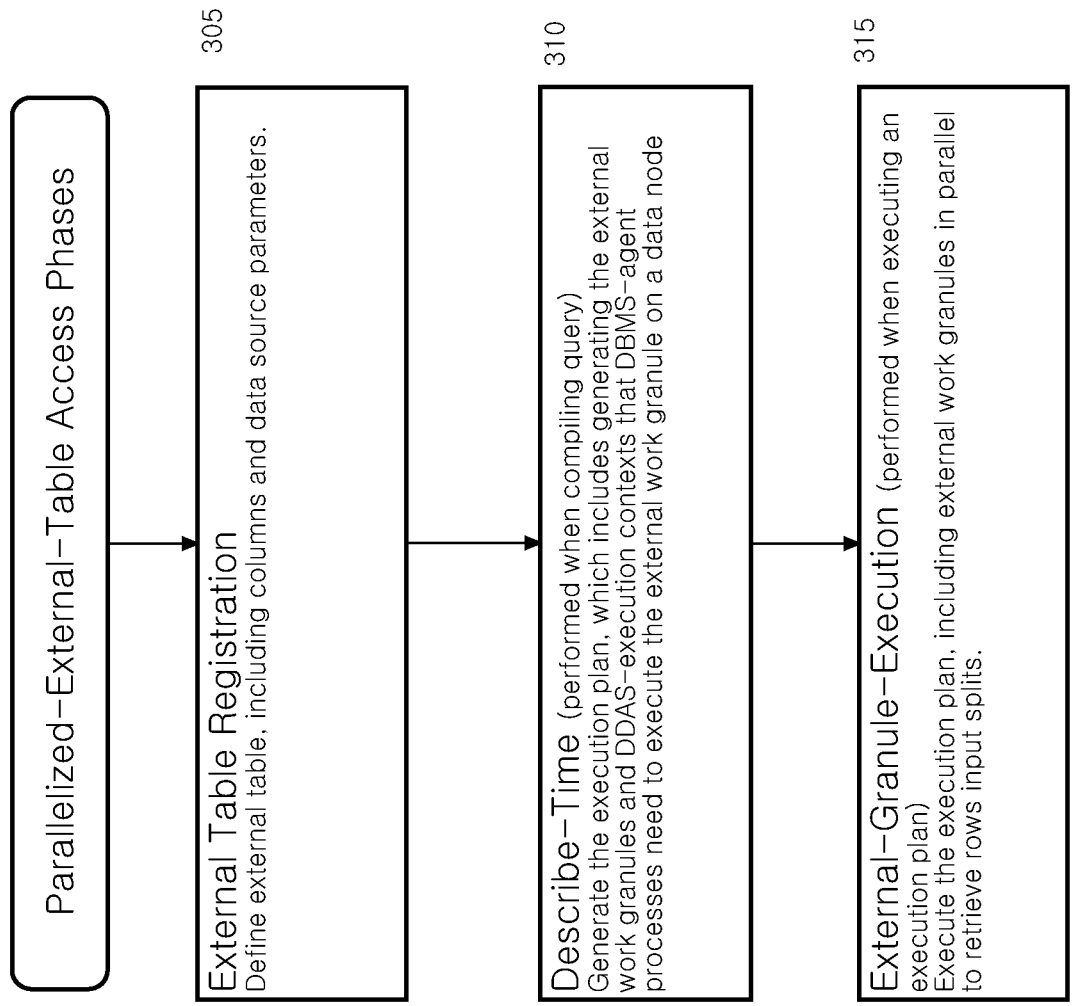
FIG. 3 is a flow chart depicting phases of storage-side-external-table scanning according to an embodiment of the present invention.

As mentioned before, using storage-side-external-table scanning entails three phases: the External Table Registration phase, the Describe-Time phase, and the External-Granule-Execution phase. FIG. 3 is a flow chart depicting these phases. Each phase is summarized below, and then explained in greater detail in following sections.

In External Table Registration 305, an external table is defined by DBMS 102 in response to receiving one or more DDL statements. Defining an external table entails defining columns of the external table and data source parameters that specify how to retrieve rows from a distributed Data Access System 104 for the external table.

Describe-Time phase 310 is performed when compiling a query and includes aspects of compiling a query that are specific for storage-side-external-table scanning. These aspects include generating the external work granules for an execution plan, DDAS-execution contexts that a DBMS-agent process needs to execute the external work granule on a data node, and scanning criteria.

In External-Granule-Execution phase 315, the external work granules of an execution plan are executed. For a slave process executing an external work granule, the slave process interacts with a DBMS-agent process on a data node to cause the DBMS-agent process to execute its portion of an external work granule, which includes retrieving rows in the way specified by a DDAS-execution context. The DDAS-execution context is passed to the DBMS-agent process by the slave process.

Compiling and executing a database statement under storage-side-external-table scanning not only involves aspects that are specific to storage-side-external-table scanning but aspects more generally applicable to executing a query database statement. For example, execution of a query database statement under storage-side-external-table scanning not only includes executing plan operations that are specific to storage-side-external-table scanning but also more generally applicable plan operations. Such more generally applicable plan operations include scanning, project, and filtering rows from tables spaces of native database tables, filtering rows retrieved for an external table, join operations, sort operations, and aggregation operations. For purposes of exposition of storage-side-external-table scanning, more generally applicable aspects of compiling and executing a database statement are not described in as great as detail as those aspects specific to storage-side-external-table scanning.

External Table Registration Phase

In this phase, an external table is defined by DBMS 102, which DBMS 102 may do in response to receiving a DDL statement, such as the illustrative DDL statement described below. Defining an external table includes generating metadata in a database dictionary describing the various properties of the external table. These properties include a table name, columns and the column names and data types of the columns, and other parameters specified in a DDL statement.

Referring to FIG. 4, FIG. 4 depicts DDL statement 401. DDL statement 401 is a DDL statement declaring an external table customer_address. DDL statement 401 specifies four columns and the data types thereof, which are ca_customer_Id as a number data type, and ca_street_number, ca_state, ca_zip as character data types.

The EXTERNAL clause within the ORGANIZATION clause specifies that table customer_address is an external table. The EXTERNAL clause includes various other clauses.

The TYPE clause specifies an external table type. According to an embodiment of the present invention, there are several types of external tables. The type depends, at least in part, on whether the data source is a DDAS table defined by Distributed Data Access System 104. DDAS_TABLE type defines an external table having a data source that is a DDAS table. Another external table type is DDAS_FILE, which shall be explained later in further detail.

The external table type dictates what data source properties need to be specified in the DDL statement. For an external table of the type DDAS_TABLE, which is the external table type specified by DDL statement 401, the DDAS-modules and various details of the data source, are provided by the definition of a DDAS table in database dictionary 157 in Distributed Data Access System 104.

The ACCESS PARAMETERS clause specifies parameters that govern aspects of the Describe-Time and External-Granule Execution phases. In DDL statement 401, the ACCESS PARAMETERS include the parameter DDAS: which specifies the distributed data access system at which the data source for the external table may be accessed, which is Distributed Data Access System 104.

The LOCATION clause specifies a data source identifier to identify the data source of an external table within the distributed data access system specified that is specified by the ACCESS PAREMETERS clause. When the external table type is DDAS_TABLE, the data source identifier of the LOCATION clause identifies a DDAS table name.

Storage-side-external-table scanning is hereafter initially described in the context of the DDAS_TABLE external table type. Afterwards, storage-side-external-table scanning is described in the context of external table type DDAS_FILE.

As shall be explained in greater detail, during the describe-time phase, a mapping is generated between DBMS table columns and the DDAS table columns. By default, a DBMS table column is mapped to a DDAS table column having the same name. However, the default may be overridden by providing a specific mapping for a DBMS table column in the DDL statement defining the external table. In DDL statement 401, the parameter colmap: maps DBMS table column "ca_zip" to the DDAT table column "postal_code".

Describe-Time Phase

The Describe-Time phase is performed when compiling an query that references an external table. When compiling a query that references an external-table, the query is parsed; the parsing may include identifying an external table referenced by the query.

As mentioned previously, an embodiment of the present invention is initially illustrated using external table type DDAS_TABLE, which is an external table having a data source specified with reference to a DDAS table. Thus, the Describe-Time phase is initially described in the context of compiling a query requiring access to an external table having an external table type of DDAS_TABLE; the DDAS table is stored in a file stored in Distributed Data Access System 104.

Figure 5:
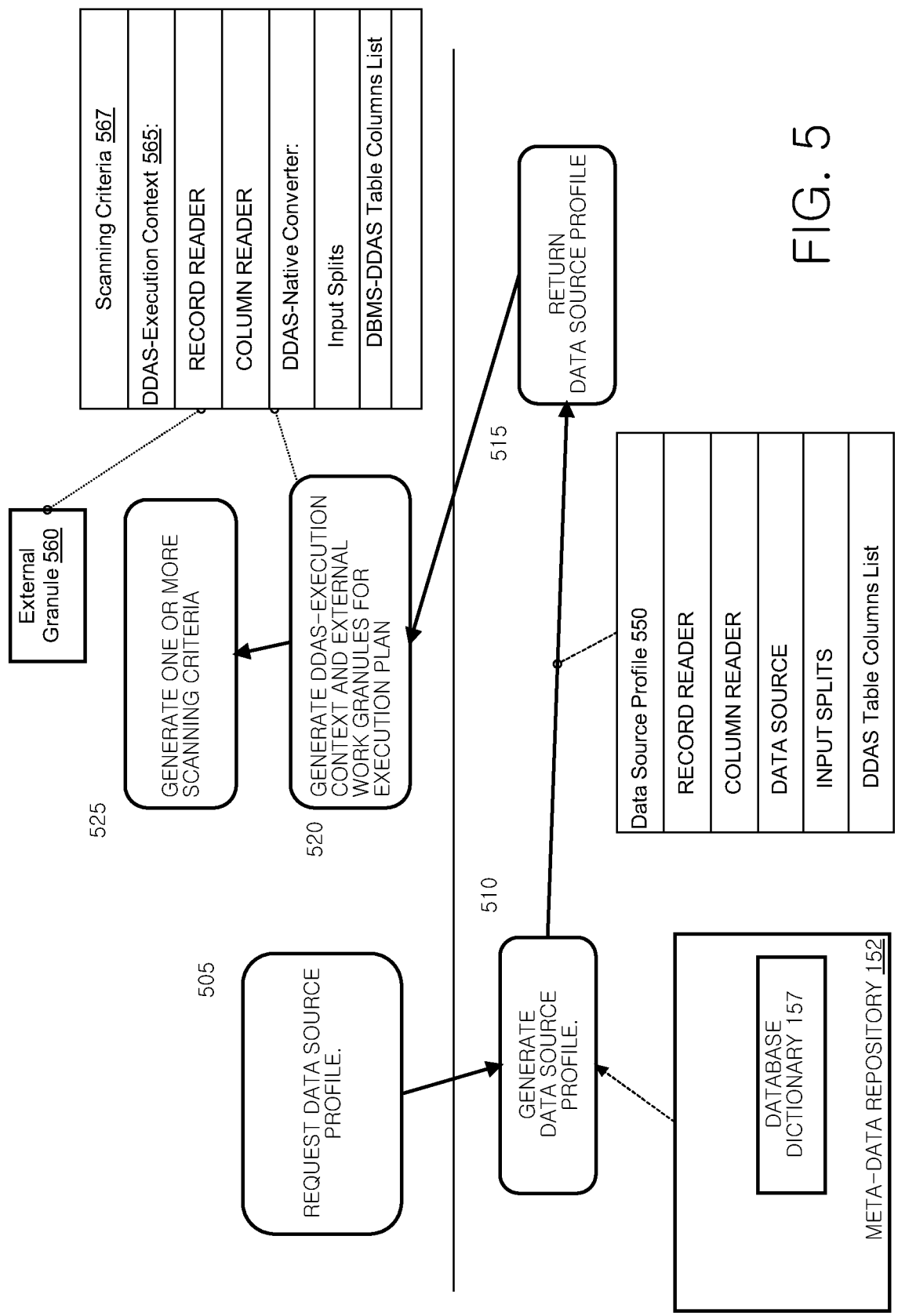
FIG. 5 is a diagram depicting operations performed during compile time for a query requiring access to an external table according to an embodiment of the present invention.

FIG. 5 depicts operations performed during the Describe-Time phase. Referring to FIG. 5, at 505, DBMS 102 transmits a request for a "data source profile", the request identifying the data source. The data source profile is information about a data source that is used to generate external work granules and DDAS-execution contexts during query compilation. At 510, Distributed Data Access System 104 receives the requests and generates Data Source Profile 550.

How the requested data source is identified by the request depends on the external table type of the external table for which the request is generated. In the current illustration, the external table type is DDAS_TABLE; thus the identified data source is a DDAS table.

According to an embodiment, Data Source Profile 550 specifies the record reader, column reader, DDAS-Native Converter, the data source and the input splits. In addition, Data Source Profile 550 includes the DDAS table columns list and the respective DDAS column data type of each DDAS table column in the list.

According to an embodiment, DBMS 102 transmits the request for a data source profile to Name Node 150, the request identifying the DDAS table. In response, Name Node 150 retrieves metadata from database dictionary 157 for the DDAS table. The metadata identifies the record reader and column reader for the DDAS table, the DDAS table columns list and respective data types of each, and the data source and input splits for the data source. In the current illustration, the data source is a file storing data for the requested DDAS table. Based on the metadata retrieved, Name Node 150 generates Data Source Profile 550 and returns the Data Source Profile 550 to DBMS 102.

In an embodiment, DBMS 102 transmits the request for a data source profile to any data node in Distributed Data Access System 104, the request identifying the DDAS table. In response, the data node retrieves metadata from database dictionary 157 for the DDAS table. Based on the metadata, the data node generates Data Source Profile 550 and returns Data Source Profile 550 to DBMS 102.

Once DBMS 102 receives the data source profile, at 520, DBMS 102 generates a DBMS-DDAS column mapping, external-table granules and a DDAS-execution context for each of the external-table granules.

The DBMS-DDAS column mapping maps each DBMS table column of the external table and its DBMS column data type to a respective DDAS table column and its DDAS column data type. By default, the mapping is based on name matching; a DBMS table column is mapped to the DDAS table column of the same name. If a DBMS table column is explicitly mapped to a DDAS table column by the definition of the external table (by for example, a COLMAP: parameter), then the DBMS-DDAS column mapping maps that DBMS table column to the DDAS table column.

According to an embodiment, an external work granule and respective DDAS-execution context is generated by DBMS 102 for each input split, such as External Work Granule 560 and DDAS-execution context 565.

DDAS-execution context 565 specifies a record reader, column reader, DDAS-Native Converter, a data source, an input split, and DBMS-DDAS column mapping.

At 525, the Scanning Criteria 567 is generated. The scanning criteria is based on criteria specified for the external table in the query. The one or more scanning criteria may include one or more projection criteria, one or more row filtering criteria, or a combination of either. The projection criteria and row scanning criteria is based on criteria specified in the query for the external table.

For example, the query may be an SQL query that specifies to select certain DBMS table columns from the external table. The projection criteria would identify the certain table columns. A predicate in the WHERE clause may specify that rows to return have a table column value for a certain DBMS table column. The filtering criteria would specify that the certain DBMS table column should be equal to the column value.

External-Granule-Execution Phase

Figure 6A:
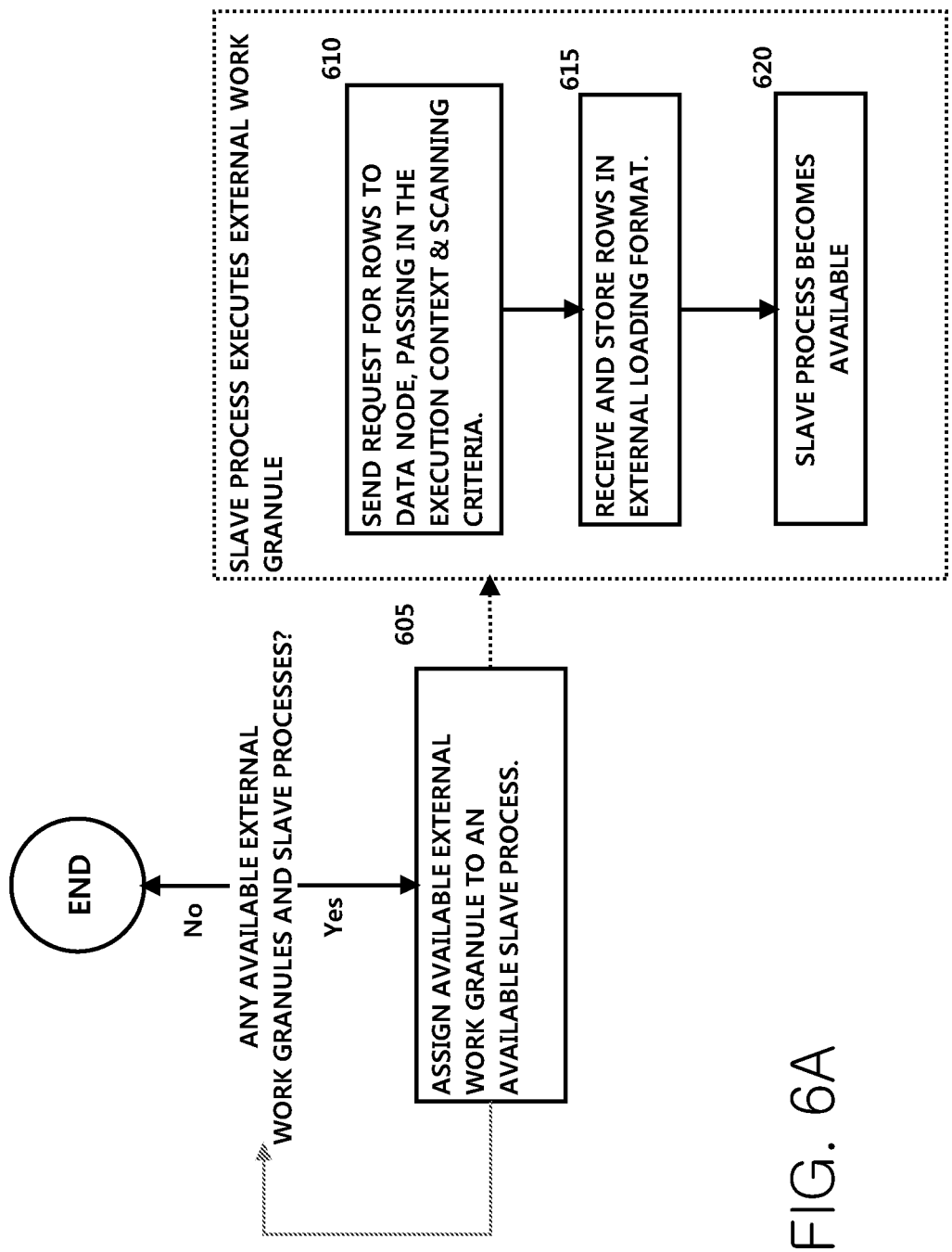
FIG. 6A is a flowchart depicting operations performed by a DBMS to execute external work granules storage-side-external-table scanning according to an embodiment of the present invention.
Figure 6B:
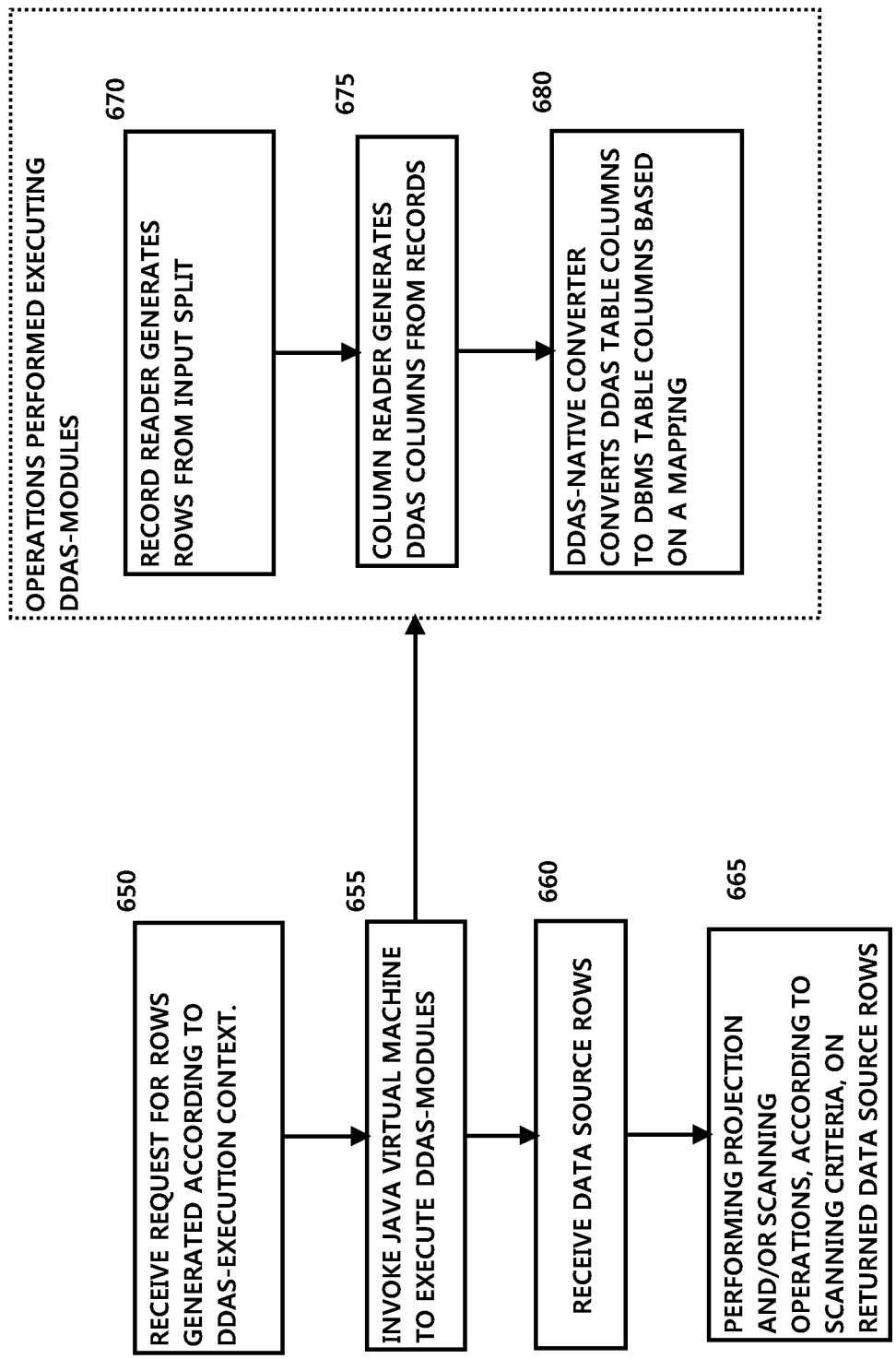
FIG. 6B is a flowchart depicting operations performed by a distributed data access system to execute external work granules under parallelized-external-table access according to an embodiment of the present invention.

FIGS. 6A and 6B depict procedures performed during the External-Granule-Execution phase. FIG. 6A depicts operations performed by DBMS 102 during the External-Granule-Execution phase. FIG. 6B depicts operations performed by Distributed Data Access System 104 during the External-Granule-Execution.

As mentioned before, the External-Granule-Execution phase comprises executing external work granules that are part of an execution plan that comprises a larger set of work granules and plan operations being executed by a set of slave processes. FIG. 6A depicts operations performed during the External-Granule-Execution phase and not other plan operations of the execution plan.

During the External-Granule-Execution phase, each slave process of a set of slave processes is assigned an external work granule. Thus, multiple slave processes may each be concurrently executing a separate external work granule. When a slave process completes execution of an external work granule, another unexecuted external work granule is assigned to and executed by the slave process.

Referring to FIG. 6A, at 605, an available slave process that is not executing an external work granule is assigned an unassigned external work granule that has not been executed.

Operations 610-620 are operations performed by a slave process assigned an external work granule. At 610, the slave process sends a request to a DBMS-agent process on the data node specified by the input split of the DDAS-execution context for the external work granule. The slave process sends the DDAS-execution context with the request and Scanning Criteria 567.

At 615, the slave process receives the scanned rows in an external-loading format and stores the rows. The rows may be stored in a buffer to be further processed by another execution plan operation. For example, the execution plan may include a filtering plan operation for filtering rows from an external table based on a column predicate. A slave process executing a work granule for the plan operation may access the rows in the buffer to filter the rows based on the column predicate.

At 620, the slave process, after completing the external work granule, becomes available for assignment of another external work granule.

Data-Node Side

FIG. 6B depicts operations performed by a Distributed Data Access System 104 in response to receiving a request for rows from a slave process executing an external work granule. The operations are performed by execution of DB-COMPONENT 252 by a DBMS-agent process.

Referring to FIG. 6B, at 650, the DBMS-agent process receives the request to generate scanned rows. A DDAS-execution context and Scanning Criteria 567 is sent along with the request.

At 655, a DBMS-agent process invokes a virtual machine to execute the DDAS modules specified in the DDAS-execution context. The virtual machine may be executed by the DBMS-agent process or by another process running on the data node. Operations 670, 675, and 680 are operations executed by execution of DDAS modules.

At 670, the record reader generates records from the input split specified in the DDAS-execution context 240.

At 675, the column reader generates DDAS table columns for the records generated by the record reader.

At 680, the DDAS-Native converter converts the DDAS table columns in the records to data source rows with DBMS table columns formatted in the external-loading format. The conversion requires a mapping between the DDAS table columns and DBMS table columns. The values in each DDAS table column are converted into values for the DBMS table column mapped to the DDAS table column; the conversion may entail changing the data type values for a DBMS table column from a DDAS column data type to a DBMS column data type.

According to an embodiment, for an external-loading format, the row format separates rows using delimiters. Each DBMS column value in a row is represented by length-value pairs and has a DBMS column data type. The order of column length-value pair is in the order the DBMS 102 expects for the external table.

At 660, the data sources rows are received by DB-COMPONENT 252.

At 665, the DBMS-agent process executing the DB-COMPONENT 252 performs projection and/or scanning operations according Scanning Criteria 567, thereby generating scanned rows. The scanned rows are returned to DBMS 102.

External Table Type

As mentioned earlier, another external table type is DDAS_FILE. For this external data type, the external table definition of the external table specifies an external file, instead of a DDAS table, as the data source, and specifies the DDAS-Modules to execute to generate rows from the file. Other aspects of storage-side-external-table scanning differ as well.

FIG. 7 depicts DDL statement 701, a DDL statement used to define an external table of the external table type DDAS_FILE. Referring to FIG. 7, DDL statement 701 declares an external table shipping_address. DDL statement 701 specifies four columns and the data types thereof, which are sh_customer_Id as a number data type, and sh_street_number, sh_state, and sh_zip as character data types.

The EXTERNAL clause within the ORGANIZATION clause specifies that table shipping_address is an external table. The TYPE clause specifies the external table type DDAS_FILE.

ACCESS PARAMETERS include the parameter DDAS: which specifies DDAS_104 for the distributed data access system that stores the external file, which is Distributed Data Access System 104.

Parameter COLUMN_READER identifies the column reader DDAS_104.ext_tab_lib.ShASer. Parameter RECORD READER identifies a record reader DDAS_104.ext_tab_lib.ShAOutput. Parameter DDAS_NATIVE_CONVERTER identifies a native converter DDAS_104.ext_tab_lib.ORA_ELF.

The LOCATION clause specifies the data source as external table 'DDAS/DDAS_104'/'shippingAddresses.json' within Distributed Data Access System 104.

The DDAS-Modules specified in DDL statement 701 may be customized by developers to generate rows from specific data sources or types of data sources. For example, the external file 'DDAS/DDAS_104'/'shippingAddresses.json' may contain JSON objects, each specifying a shipping address. The record reader DDAS_104.ext_tab_lib.ShAOutput generates a record for each JSON object. For each such record, the column reader DDAS_104.ext_tab_lib.ShASer generates a record with column values corresponding to the attribute values of the JSON object. All the column values have a string DDAS column type.

The DDAS_NATIVE_CONVERTER DDAS_104.ext_tab_lib.ORA_ELF converts records and column values therein to the external-loading format. This DDAS-Native converter is not developed specifically for the JSON objects but is a more a generally applicable module. The DDAS_NATIVE_CONVERTER DDAS_104.ext_tab_lib.ORA_ELF expects a column order associated with columns of the external table to coincide with the column order of the columns in the records generated by the column reader. DDAS-Native converter uses a DBMS table column list provided in a DDAS-execution context, which specifies the DBMS column data type of each and reflects the order of columns in the external table. For each column in a record generated by a column reader, the DDAS-Native converter converts the string value in the column to a value of the DBMS column data type of the DBMS table column having the corresponding column order, according to the DBMS table column list.

The metadata generated in the database dictionary of DBMS 102 includes different content for external table type DDAS_FILE. For example, the metadata specifies a record reader, column reader, DDAS-Native converter, and an external file.

Various aspects of the Describe-Time phase differ as well. During the Describe-Time phase, when DBMS 102 requests a data source profile, the request identifies a file as the data source. The data source profile specifies input splits for the file but does not include information such as DDAS table column lists, and does not include information that identifies a recorder reader, column reader, and DDAS-Native converter, since these DDAS-modules are supplied by the DBMS for the external table.

The content of the DDAS-execution contexts differs too. A DBMS-DDAS columns list is not provided because the data source identified is a file rather than a DDAS table. Instead, DBMS table column list may be provided in the DDAS-execution context, if needed to enable or otherwise facilitate rows in external-loading format.

Composite Data Source

A DDAS table may be stored in a composite data source, which comprises multiple data sources referred to herein as constituent data sources. The constituent data sources may have a different format and/or type, each of which may require different DDAS-modules to process.

During the Describe-Time phase, the data source profile provides information specific to each composite data source. For each composite data source, the data source profile may specify different DDAS-modules. A DDAS-execution context identifies the DDAS-modules specified by the Data source profile for the respective composite data source. Thus, DDAS-execution contexts may identify different DDAS modules.

DBMS Overview

A DBMS manages one or more databases. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMS's, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database, as well as other kinds of operations. A database command may be in the form of a database statement that conforms to a database language. A database language for expressing the database commands is the Structured Query Language (SQL). There are many different versions of SQL, some versions are standard and some proprietary, and there are a variety of extensions. Data definition language commands are issued to a database server to create or configure database objects, such as tables, views, or complex data types. DDL commands are used to configure a database server for a particular hardware environment, to configure computer resource usage of the database server, as well as other operating aspects of the database server.

A multi-node database management system is made up of interconnected nodes that share access to the same database or databases. Typically, the nodes are database server hosts interconnected via a network and share access, in varying degrees, to shared storage, e.g. shared access to a set of disk drives and data blocks stored thereon. Each node in a multi-node database system hosts a database server. A server, such as a database server, is a combination of software and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to as a "server instance" or "instance". A database server may comprise multiple database instances, some or all of which are running on separate computers, including separate server blades.

The term process refers to a computer system process, which is described below in the HARDWARE OVERVIEW. Processes that comprise a database server run under the control of the database server (i.e. can be created or terminated by the database server) and perform various database server functions. Such processes are referred to herein as database server processes. Database server processors include listeners, garbage collectors, log writers, "server processes" for database sessions for executing database commands issued by database clients (including processes executing within shared sessions), and recovery processes.

In addition, further details of processing external tables, storage-side-external-table scanning scanning may be found in the following documents in this paragraph. All the following documents in this paragraph are incorporated herein by reference: Oracle® Big Data Appliance, Software User's Guide, Release 4 (4.0), E55814-03; and U.S. patent application Ser. No. 13/866,866, "Caching External Data Sources For SQL Processing", filed by Atif Chaudry, et al. on Apr. 19, 2013.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
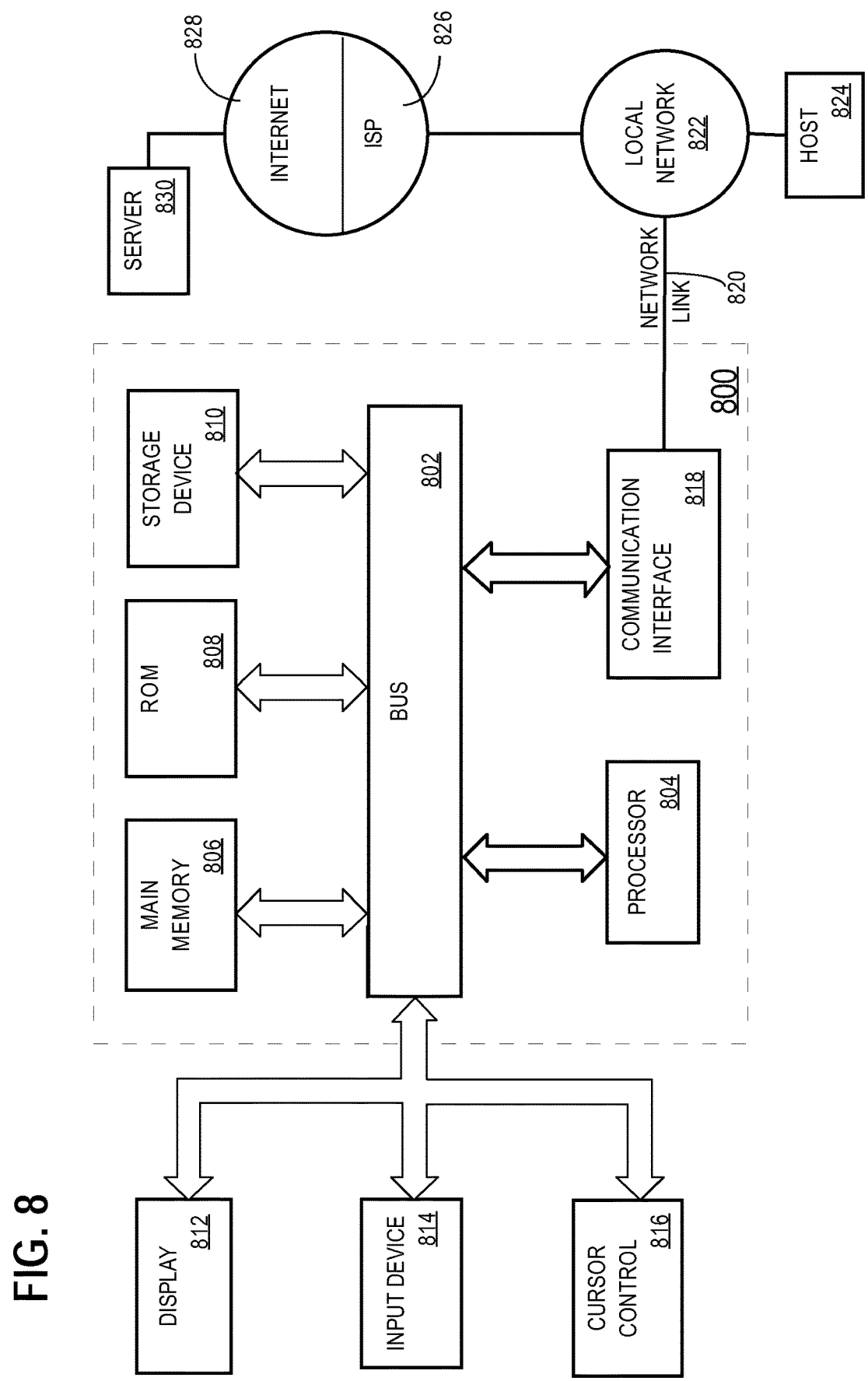
FIG. 8 is a diagram depicting a computer system that may be used to implement an embodiment of the present invention.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. A computer system process comprises an allotment of processor time, and an allotment of memory (physical and/or virtual), the allotment of memory being for storing instructions executed by the processor, for storing data generated by the processor executing the instructions, and/or for storing the processor state (e.g. content of registers) between allotments of the processor time when the computer system process is not running. Computer system processes run under the control of an operating system, and may run under the control of other programs being executed on the computer system.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

A computer system process comprises an allotment of processor time, and an allotment of memory (physical and/or virtual), the allotment of memory being for storing instructions executed by the processor, for storing data generated by the processor executing the instructions, and/or for storing the processor state (e.g. content of registers) between allotments of the processor time when the computer system process is not running. Computer system processes run under the control of an operating system, and may run under the control of other programs being executed on the computer system.

In the specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for execution by a distributed data access system, said distributed data access system comprising a plurality of data nodes and an external data source that comprises a first plurality of columns having a first plurality of data types, the method comprising:

receiving a profile request from a database management system (DBMS) for profile information about the external data source, wherein the distributed data access system does not contain the DBMS;

returning said profile information, said profile information specifying a plurality of input splits for the external data source, wherein each input split of said plurality of input splits maps a separate portion of a plurality of data portions of the external data source to a respective data node that stores said separate portion of the plurality of data portions, wherein each data node of the plurality of data nodes comprises at least one hardware processor;

for each data node of said plurality of data nodes:
  a) respectively receiving a retrieval request from the DBMS for particular rows that satisfy one or more scanning criteria, said data node corresponding to a particular input split belonging to said plurality of input splits, said retrieval request specifying said one or more scanning criteria and a data type converter;
  b) according to said one or more scanning criteria, said data node generating said particular rows from a data source split corresponding to said input split, wherein:
    said particular rows contain converted values that are generated by the data type converter using a column mapping from the first plurality of columns having the first plurality of data types of the external data source to a second plurality of columns having a second plurality of data types that are native to the DBMS,
    the second plurality of columns are part of an external table that is based on the external data source,
    the external table, including that the second plurality of columns respectively have the second plurality of data types, is defined in a data dictionary of the DBMS,
    said converted values have said data types that are native to the DBMS, said data source split stores data in a storage format that is not a native database storage format; and
  c) returning said particular rows to said DBMS, said particular rows being returned in a format supported by said DBMS.

2. The method of claim 1, wherein for a particular data node of said plurality of data nodes, said generating said particular rows includes:
generating certain rows from data from said data source split, said certain rows having said format supported by said DBMS; and
applying said one or more scanning criteria to generate said particular rows.

3. The method of claim 2, wherein said generating certain rows includes: generating records and columns from said data from said data source split; and converting said records and columns to said certain rows.

4. The method of claim 3, wherein said retrieval request received by said particular data node specifies one or more code modules, wherein execution of said one or more code modules causes generating said records and columns.

5. A method comprising:
storing, within a data dictionary of a database management system (DBMS), metadata that defines data types of columns of an external table that is based on an external data source;
the DBMS generating an execution plan for a query that requires access to an external table, wherein data for said external table is stored in a data source that: a) is accessible on a distributed data access system comprising a plurality of data nodes, and b) comprises a plurality of data portions, wherein the distributed data access system does not contain the DBMS, wherein generating said execution plan includes:
sending to said distributed data access system a profile request for a profile information of said data source;
receiving said profile information, said profile information specifying a plurality of input splits for the data source, wherein each input split of said plurality of input splits maps a respective data node to a respective portion of said plurality of data portions; and
generating a plurality of external work granules for generating rows from said data source that satisfy one or more scanning criteria, each external work granule of said plurality of external work granules being for generating respective rows from a respective input split that satisfy said one or more scanning criteria;
said DBMS executing said execution plan, wherein executing said execution plan comprises, for a particular work granule of said plurality of external work granules, for each data node of said plurality of data nodes corresponding to the respective input split of said particular work granule:
a) sending a retrieval request from the DBMS to data node, said retrieval request to the data node requesting the respective rows for said respective input split, said retrieval request to the data node specifying said one or more scanning criteria;
b) said data node generating said respective rows that contain values that have said data types of said columns as defined by said metadata; and
c) receiving the respective rows from said data node.

6. The method of claim 5, wherein for each data node of said plurality of data nodes, said receiving the respective rows from said each data node includes receiving the respective rows in a row format supported by said DBMS.

7. The method of claim 6, wherein said data source stores data in a storage format that is not a native database storage format.

8. The method of claim 5, wherein for each data node of said plurality of data nodes, the retrieval request identifies code modules to execute to generate particular rows from the respective portion for said respective input split.

9. The method of claim 8, wherein:
for each data node of said plurality of data nodes, said code modules are configured to generate said particular rows from data that is in a storage format that is not a native database storage format.

10. The method of claim 8, wherein for each data node of said plurality of data nodes, said code modules comprise: one or more record reader modules for generating records from said data source; and one or more column reader modules for generating column values from records generated by said one or more record reader modules.

11. One or more non-transitory computer-readable storage media storing instructions which, when executed by a distributed data access system comprising a plurality of data nodes and an external data source that comprises a first plurality of columns having a first plurality of data types, cause:
receiving a profile request from a database management system (DBMS) for profile information about the external data source, wherein the distributed data access system does not contain the DBMS;
returning said profile information, said profile information specifying a plurality of input splits for the external data source, wherein each input split of said plurality of input splits maps a separate portion of a plurality of data portions of the external data source to a respective data node that stores said separate portion of the plurality of data portions, wherein each data node of the plurality of data nodes comprises at least one hardware processor;
for each data node of said plurality of data nodes:
a) respectively receiving a retrieval request from the DBMS for particular rows that satisfy one or more scanning criteria, said data node corresponding to a particular input split belonging to said plurality of input splits, said retrieval request specifying said one or more scanning criteria and a data type converter;
b) according to said one or more scanning criteria, said data node generating said particular rows from a data source split corresponding to said input split, wherein:
said particular rows contain converted values that are generated by the data type converter using a column mapping from the first plurality of columns having the first plurality of data types of the external data source to a second plurality of columns having a second plurality of data types that are native to the DBMS,
the second plurality of columns are part of an external table that is based on the external data source,
the external table, including that the second plurality of columns respectively have the second plurality of data types, is defined in a data dictionary of the DBMS,
said converted values have said data types that are native to the DBMS,
said data source split stores data in a storage format that is not a native database storage format;
returning said particular rows to said DBMS, said particular rows being returned in a format supported by said DBMS.

12. The one or more non-transitory computer-readable storage media of claim 11, wherein for a particular data node of said plurality of data nodes, said generating said particular rows includes:
   generating certain rows from data from said data source split, said certain rows having said format supported by said DBMS; and
   applying said one or more scanning criteria to generate said particular rows.

13. The one or more non-transitory computer-readable storage media of claim 12, wherein said generating certain rows includes:
   generating records and columns from said data from said data source split; and
   converting said records and columns to said certain rows.

14. The one or more non-transitory computer-readable storage media of claim 13, wherein said retrieval request received by said particular data node specifies one or more code modules, wherein execution of said one or more code modules causes generating said records and columns.

15. One or more non-transitory computer-readable storage media storing sequences of instructions, which when executed by one or more computing devices, cause:
   storing, within a data dictionary of a database management system (DBMS), metadata that defines data types of columns of an external table that is based on an external data source;
   the DBMS generating an execution plan for a query that requires access to an external table, wherein data for said external table is stored in a data source that: a) is accessible on a distributed data access system comprising a plurality of data nodes, and b) comprises a plurality of data portions, wherein the distributed data access system comprises the external data source and does not contain the DBMS, wherein generating said execution plan includes:
      sending to said distributed data access system a profile request for a profile information of said data source;
      receiving said profile information, said profile information specifying a plurality of input splits for the data source, wherein each input split of said plurality of input splits maps a respective data node to a respective portion of said plurality of data portions; and
      generating a plurality of external work granules for generating rows from said data source that satisfy one or more scanning criteria, each external work granule of said plurality of external work granules being for generating respective rows from a respective input split that satisfy said one or more scanning criteria;
   said DBMS executing said execution plan, wherein executing said execution plan comprises, for a particular work granule of said plurality of external work granules, for each data node of said plurality of data nodes corresponding to the respective input split of said particular work granule:
      a) sending a retrieval request from the DBMS to data node, said retrieval request to the data node requesting the respective rows for said respective input split, said retrieval request to the data node specifying said one or more scanning criteria;
      b) said data node generating said respective rows that contain values that have said data types of said columns as defined by said metadata; and
      c) receiving the respective rows from said data node.

16. The one or more non-transitory computer-readable storage media of claim 15, wherein for each data node of said plurality of data nodes, said receiving the respective rows from said each data node includes receiving the respective rows in a row format supported by said DBMS.

17. The one or more non-transitory computer-readable storage media of claim 16, wherein said data source stores data in a storage format that is not a native database storage format.

18. The one or more non-transitory computer-readable storage media of claim 15, wherein for each data node of said plurality of data nodes, the retrieval request identifies code modules to execute to generate particular rows from the respective portion for said respective input split.

19. The one or more non-transitory computer-readable storage media of claim 18, wherein:
   for each data node of said plurality of data nodes, said code modules are configured to generate said particular rows from data
   that is in a storage format that is not a native database storage format.

20. The one or more non-transitory computer-readable storage media of claim 18, wherein for each data node of said plurality of data nodes, said code modules comprise:
   one or more record reader modules for generating records from said data source; and
   one or more column reader modules for generating column values from records generated by said one or more record reader modules.

21. The method of claim 1 wherein each data node of said plurality of data nodes can perform said receiving said profile request.

* * * * *

UNITED STATES PATENT AND TRADEMARK OFFICE
CERTIFICATE OF CORRECTION

Page 1 of 2

PATENT NO. : 10,936,616 B2
APPLICATION NO. : 14/733691
DATED : March 2, 2021
INVENTOR(S) : Potapov et al.

It is certified that error appears in the above-identified patent and that said Letters Patent is hereby corrected as shown below:

On the Title Page

Column 2, under Abstract, Line 2, delete "(DBMS" and insert -- (DBMS) --, therefor.

On page 2, Column 2, under Other Publications, Line 2, delete "Datebank-Specktum," and insert -- Datenbank-Spektrum, --, therefor.

On page 2, Column 2, under Other Publications, Line 29, delete "perWatt"," and insert -- per Watt", --, therefor.

In the Drawings

On sheet 3 of 10, in FIG. 2B, under Reference Numeral 242, Line 1, delete "CRTERIA" and insert -- CRITERIA --, therefor.

In the Specification

In Column 10, Line 9, delete "be" and insert -- be. --, therefor.

In Column 11, Line 48, delete "DDAS:" and insert -- DDAS:, --, therefor.

In Column 11, Line 55, delete "PAREMETERS" and insert -- PARAMETERS --, therefor.

In Column 12, Line 3, delete "DDAT" and insert -- DDAS --, therefor.

In Column 15, Line 5, delete "DDAS:" and insert -- DDAS:, --, therefor.

In Column 15, Line 11, delete "RECORD READER" and insert -- RECORD_READER --, therefor.

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*

In Column 15, Lines 16-17, delete "'DDAS/DDAS_104'/'shippingAddresses.json'" and insert -- 'DDAS:/DDAS_104'/'shippingAddresses.json' --, therefor.

In Column 15, Line 21, delete "'DDAS/DDAS_104'/'shippingAddresses.json'" and insert -- 'DDAS:/DDAS_104'/'shippingAddresses.json' --, therefor.

In Column 17, Line 16, delete "scanning scanning" and insert -- scanning --, therefor.

In the Claims

In Column 21, Line 52, in Claim 5, after "to" insert -- said --.

In Column 22, Line 64, in Claim 11, after "format;" insert -- and --.

In Column 22, Line 65, in Claim 11, before "returning" insert -- c) --.

In Column 24, Line 7, in Claim 15, after "to" insert -- said --.